United States Patent
Chen (10) Patent No.: US 10,616,110 B2
(45) Date of Patent: Apr. 7, 2020

(54) PACKET TRANSMISSION METHOD, APPARATUS, AND SYSTEM

(71) Applicant: HUAWEI TECHNOLOGIES CO., LTD., Shenzhen, Guangdong (CN)

(72) Inventor: Huadong Chen, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/194,934

(22) Filed: Nov. 19, 2018

(65) Prior Publication Data

US 2019/0089632 A1 Mar. 21, 2019

Related U.S. Application Data

(63) Continuation of application No. PCT/CN2016/082803, filed on May 20, 2016.

(51) Int. Cl.
*H04L 12/741* (2013.01)
*H04L 12/46* (2006.01)
(Continued)

(52) U.S. Cl.
CPC ........ *H04L 45/745* (2013.01); *H04L 12/4633* (2013.01); *H04L 45/72* (2013.01);
(Continued)

(58) Field of Classification Search
CPC ..... H04W 76/11; H04W 24/00; H04W 88/16; H04L 12/4633; H04L 45/72; H04L 67/2842; H04L 45/745
See application file for complete search history.

(56) References Cited

U.S. PATENT DOCUMENTS 8,762,501 B2 * 6/2014 Kempf ................ H04L 12/4633
  709/220
10,193,798 B2 * 1/2019 Roeland ............. H04L 12/4633
  (Continued)

FOREIGN PATENT DOCUMENTS

| CN | 101540992 A | 9/2009 |
| CN | 103731929 A | 4/2014 |

(Continued)

OTHER PUBLICATIONS

International Search Report dated Feb. 13, 2017 in corresponding International Application No. PCT/CN2016/082803.
(Continued)

*Primary Examiner* — Abdullahi E Salad
(74) *Attorney, Agent, or Firm* — Womble Bond Dickinson (US) LLP (57) ABSTRACT

A packet transmission method, an apparatus, and a system are provided, to improve packet transmission efficiency. An SDN forwarding apparatus receives an uplink GTPU packet from a base station, where the uplink GTPU packet carries an IP address of a target server; the SDN forwarding apparatus determines whether the target server is an intranet server; and when the target server is an intranet server, the SDN forwarding apparatus sends the uplink GTPU packet to a target gateway, where the target gateway is a gateway corresponding to the target server; or when the target server is not an intranet server, the SDN forwarding apparatus sends the uplink GTPU packet to a serving gateway.

14 Claims, 7 Drawing Sheets

(51) Int. Cl.
- *H04L 12/721* (2013.01)
- *H04L 29/08* (2006.01)
- *H04W 76/11* (2018.01)
- *H04W 24/00* (2009.01)
- *H04W 88/16* (2009.01)

(52) U.S. Cl.
CPC ......... *H04L 67/2842* (2013.01); *H04W 24/00* (2013.01); *H04W 76/11* (2018.02); *H04W 88/16* (2013.01)

(56) References Cited

U.S. PATENT DOCUMENTS

| | | | |
|---|---|---|---|
| 2014/0325649 A1 | 10/2014 | Zhang et al. | |
| 2015/0271710 A1 | 9/2015 | Zhang et al. | |
| 2016/0119165 A1* | 4/2016 | Keronen | H04L 12/4633 370/254 |
| 2016/0127975 A1 | 5/2016 | Hu et al. | |
| 2019/0190820 A1* | 6/2019 | Roeland | H04L 12/4633 |

FOREIGN PATENT DOCUMENTS

| | | |
|---|---|---|
| CN | 103841056 A | 6/2014 |
| CN | 103857004 A | 6/2014 |
| CN | 104601432 A | 5/2015 |
| CN | 104780088 A | 7/2015 |
| CN | 104837147 A | 8/2015 |
| CN | 105099799 A | 11/2015 |
| CN | 105376811 A | 3/2016 |
| CN | 105493450 A | 4/2016 |
| EP | 3094051 A1 | 11/2016 |
| WO | 2014/085207 A1 | 6/2014 |
| WO | 2015/113297 A1 | 8/2015 |
| WO | 2015/131926 A1 | 9/2015 |
| WO | 2015195200 A1 | 12/2015 |

OTHER PUBLICATIONS

International Search Report dated Feb. 13, 2017 in International Patent Application No. PCT/CN2016/082803 (7 pages).

Written Opinion of the International Searching Authority dated Feb. 13, 2017 in International Patent Application No. PCT/CN2016/082803 (5 pages).

Nokia Siemens Networks et al.,"IP connectivity issues in Local IP access",3GPP TSG SA WG2 Meeting #75 TD S2-096012,Aug. 31-Sep. 4, 2009, Kyoto, Japan,total 4 pages.

* cited by examiner

PACKET TRANSMISSION METHOD, APPARATUS, AND SYSTEM

CROSS-REFERENCE TO RELATED APPLICATIONS

This application is a continuation of International Application No. PCT/CN2016/082803, filed on May 20, 2016, the disclosure of which is hereby incorporated by reference in its entirety.

TECHNICAL FIELD

The present invention relates to the communications field, and in particular, to a packet transmission method, an apparatus, and a system.

BACKGROUND

In the prior art, with development of a Long Term Evolution (LTE) system, cache servers are deployed on edge gateways at various locations in a content delivery network (CDN). With scheduling by a central platform, user equipment (UE) may access a nearby cache server of the edge cache servers at various locations. Generally, the UE accesses the Internet through a base station, a serving gateway (SGW), and a packet data network gateway (PGW). In a case of a single packet data network (PDN) connection, the UE is connected to the Internet through the PGW. When a target server to be accessed by a general packet radio service tunneling protocol user plane (GTPU) packet sent by the UE is a server deployed on another GW different from the PGW, the GTPU packet needs to be transmitted to the target server through the base station, the SGW, the PGW, and the GW. This packet transmission path causes route recurvation, which is not conducive to network resource saving.

SUMMARY

The present invention provides a packet transmission method, an apparatus, and a system, to improve packet transmission efficiency.

According to a first aspect, a packet transmission method is provided, including: receiving, by a software-defined networking (SDN) forwarding apparatus, an uplink GTPU packet from a base station, where the uplink GTPU packet carries an Internet Protocol (IP) address of a target server; determining, by the SDN forwarding apparatus, whether the target server is an intranet server; and when the target server is an intranet server, sending, by the SDN forwarding apparatus, the uplink GTPU packet to a target gateway, where the target gateway is a gateway corresponding to the target server; or when the target server is not an intranet server, sending, by the SDN forwarding apparatus, the uplink GTPU packet to a serving gateway.

When determining that the target server of the uplink GTPU packet is an intranet server, the SDN forwarding apparatus directly sends the GTPU packet to the target gateway corresponding to the target server, so as to avoid route recurvation of an access path and save network resources.

In a possible design, the sending, by the SDN forwarding apparatus, the uplink GTPU packet to a target gateway includes: determining, by the SDN forwarding apparatus, an IP address of the target gateway and a tunnel endpoint identifier TEID of the target gateway; and sending, by the SDN forwarding apparatus, the uplink GTPU packet to the target gateway according to the IP address the TEID of the target gateway.

In a possible design, the determining, by the SDN forwarding apparatus, an IP address of the target gateway and a TEID of the target gateway includes: receiving, by the SDN forwarding apparatus, the IP address and the TEID of the target gateway from an SDN controller, where the SDN controller is configured to instruct the target gateway to assign the TEID.

In a possible design, the sending, by the SDN forwarding apparatus, the uplink GTPU packet to the target gateway according to the IP address the TEID of the target gateway includes: setting, by the SDN forwarding apparatus, a destination IP address of the uplink GTPU packet to the IP address of the target gateway, and setting a destination TEID of the uplink GTPU packet to the TEID.

In a possible design, the determining, by the SDN forwarding apparatus, whether the target server is an intranet server includes: determining, by the SDN forwarding apparatus based on the IP address of the target server, whether the target server is an intranet server.

In a possible design, the method further includes: receiving, by the SDN forwarding apparatus, a downlink GTPU packet; and sending, by the SDN forwarding apparatus, the downlink GTPU packet to the base station.

In a possible design, before the sending, by the SDN forwarding apparatus, the downlink GTPU packet to the base station, the method further includes: determining, by the SDN forwarding apparatus, whether a source IP address of the downlink GTPU packet is the IP address of the target gateway; and when the source IP address of the downlink GTPU packet is the IP address of the target gateway, changing, by the SDN forwarding apparatus, the source IP address of the downlink GTPU packet to an IP address of the serving gateway.

According to another aspect, a packet transmission method is provided, including: receiving, by an SDN controller, query information corresponding to an uplink GTPU packet from an SDN forwarding apparatus or a packet gateway, where the uplink GTPU packet carries an IP address of a target server; determining, by the SDN controller, an IP address of a target gateway and a tunnel endpoint identifier TEID of the target gateway, where the target gateway is a gateway corresponding to the target server; and sending, by the SDN controller, the IP address and the TEID of the target gateway to the SDN forwarding apparatus or the packet gateway, so that the SDN forwarding apparatus or the packet gateway sends the uplink GTPU packet to the target gateway.

The SDN controller sends the IP address and the TEID of the target gateway corresponding to the target server to the SDN forwarding apparatus or the packet gateway, so that the SDN forwarding apparatus or the packet gateway sends the uplink GTPU packet to the target gateway, so as to avoid route recurvation of an access path and save network resources.

In a possible design, the determining, by the SDN controller, an IP address of a target gateway and a TEID of the target gateway includes: sending, by the SDN controller, an instruction message to the target gateway, where the instruction message is used to instruct the target gateway to assign a TEID; and receiving, by the SDN controller, the TEID of the target gateway from the target gateway.

In a possible design, the determining, by the SDN controller, an IP address of a target gateway and a TEID of the target gateway includes: determining, by the SDN controller, the IP address of the target gateway based on the IP address of the target server.

In a possible design, the method further includes: determining, by the SDN controller, tunnel information of the target gateway, where the tunnel information includes a first IP address and a first TEID, the first IP address is an IP address of a target device on a tunnel peer end of the target gateway, and the first TEID is a TEID of the target device; updating, by the SDN controller, the first IP address to an IP address of a base station or an IP address of the packet gateway, where the base station is a base station corresponding to the SDN forwarding apparatus; and updating, by the SDN controller, the first TEID to a TEID of the base station or a TEID of the packet gateway.

In a possible design, the method further includes: sending, by the SDN controller, the first IP address and the first TEID to the target gateway.

According to another aspect, an SDN forwarding apparatus is provided, and the SDN forwarding apparatus has a function of implementing a behavior of the SDN forwarding apparatus in the foregoing method design. The function may be implemented by hardware, or may be implemented by hardware by executing corresponding software. The hardware or the software includes one or more modules corresponding to the foregoing function.

In a possible design, a structure of the SDN forwarding apparatus includes a processing unit and a communications unit. The processing unit is configured to support the SDN forwarding apparatus in executing corresponding functions in the foregoing method. The communications unit is configured to support communication between the SDN forwarding apparatus and another device. The SDN forwarding apparatus may further include a storage unit. The storage unit is configured to couple to the processing unit, and the storage unit stores a program instruction and data that are necessary for the SDN forwarding apparatus. In an example, the processing unit may be a processor, the communications unit may be a communications interface, and the storage unit may be a memory.

According to still another aspect, an SDN controller is provided, and the SDN controller has a function of implementing a behavior of the SDN controller in the foregoing method design. The function may be implemented by hardware, or may be implemented by hardware by executing corresponding software. The hardware or the software includes one or more modules corresponding to the foregoing function.

In a possible design, a structure of the SDN controller includes a processing unit and a communications unit. The processing unit is configured to support the SDN controller in executing corresponding functions in the foregoing method. The communications unit is configured to support communication between the SDN controller and another device. The SDN controller may further include a storage unit. The storage unit is configured to couple to the processing unit, and the storage unit stores a program instruction and data that are necessary for the SDN controller. In an example, the processing unit may be a processor, the communications unit may be a communications interface, and the storage unit may be a memory.

According to still another aspect, a communications system is provided, and the system includes the SDN forwarding apparatus and the SDN controller described in the foregoing aspects.

According to yet another aspect, a computer storage medium is provided. The computer storage medium is configured to store a computer software instruction used by the SDN forwarding apparatus. The computer software instruction includes a program designed for performing the foregoing aspects.

According to yet another aspect, a computer storage medium is provided. The computer storage medium is configured to store a computer software instruction used by the SDN controller. The computer software instruction includes a program designed for performing the foregoing aspects.

Compared with the prior art, in the solutions provided in the embodiments of the present invention, when determining that the target server of the uplink GTPU packet is an intranet server, the SDN forwarding apparatus directly sends the GTPU packet to the target gateway corresponding to the target server, so as to avoid route recurvation of an access path and save network resources.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may derive other drawings from these accompanying drawings without creative efforts.

DESCRIPTION OF EMBODIMENTS

To make the purpose, technical solutions, and advantages of the embodiments of the present invention clearer, the following describes the technical solutions of the embodiments of the present invention with reference to the accompanying drawings in the embodiments of the present invention.

Network architectures and service scenarios described in the embodiments of the present invention intend to more clearly describe the technical solutions in the embodiments of the present invention, but are not intended to limit the technical solutions provided in the embodiments of the present invention. A person of ordinary skill in the art may know that as the network architectures evolve and a new service scenario emerges, the technical solutions provided in the embodiments of the present invention are further applicable to a similar technical problem.

Figure 1:
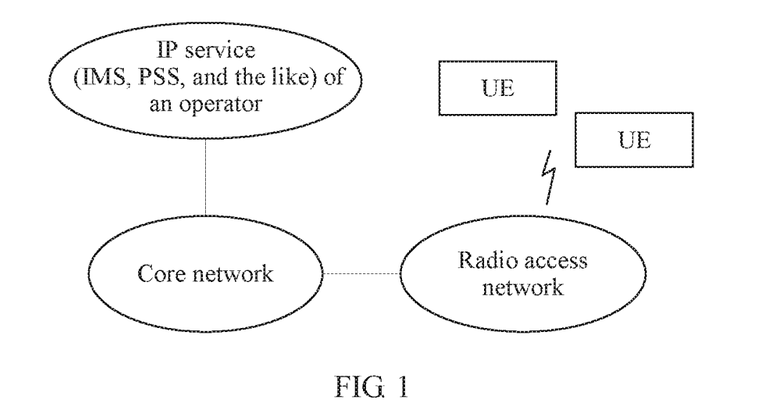
FIG. 1 is a schematic diagram of a possible application scenario according to an embodiment of the present invention.

As shown in FIG. 1, UE accesses an Internet Protocol (IP) service network of an operator, such as an IP multimedia subsystem (IMS) network or a packet switched streaming service (PSS) network, by using a radio access network (RAN) and a core network (CN). The technical solutions described in the present invention may be applied to a Long Term Evolution (LTE) system or other wireless communications systems that use various radio access technologies, for example, systems that use access technologies, such as Code Division Multiple Access (CDMA), Frequency Division Multiple Access (FDMA), Time Division Multiple Access (TDMA), orthogonal frequency division multiple access (OFDMA), and single carrier frequency division multiple access (SC-FDMA). In addition, the technical solutions may be applied to a subsequent evolved system of the LTE system, for example, a fifth generation (5G) system. For clarity, herein, only the LTE system is used as an example for description. In the LTE system, an evolved universal terrestrial radio access network (E-UTRAN) is used as a radio access network, and an evolved packet core (EPC) is used as a core network. The UE accesses the IMS network by using the E-UTRAN and the EPC.

In the embodiments of the present invention, nouns "network" and "system" are often interchangeably used, but meanings of the nouns can be understood by a person skilled in the art. The user equipment UE in the embodiments of the present invention may include various handheld devices, in-vehicle devices, wearable devices, computing devices, or other processing devices connected to a wireless modem that have a wireless communication function, and various forms of user equipments (UE), mobile stations (MS), terminals (terminal), terminal devices (terminal device), and the like. For ease of description, in the embodiments of the present invention, the devices mentioned above are collectively referred to as user equipment or UE. A base station (BS) in the embodiments of the present invention is an apparatus that is deployed on a radio access network and that is configured to provide a wireless communications function for the UE. The base station may include a macro base station, a micro base station, a relay node, an access point, and the like in various forms. In systems that use different radio access technologies, devices that have a base station function may have different names. For example, in an LTE network, a device that has a base station function is referred to as an evolved NodeB (eNB or eNodeB); and in a third generation (3G) network, a device that has a base station function is referred to as a NodeB (Node B). For ease of description, in the embodiments of the present invention, the foregoing apparatuses that provide the wireless communications function for the UE are collectively referred to as the base station or the BS.

It should be noted that, when the solutions provided in the embodiments of the present invention are applied to different system architectures, a serving gateway may be an SGW or an SGSN, and a packet gateway may be a PGW or a GGSN. For example, when the solutions are applied to an architecture in FIG. 3, the serving gateway is the SGW, and the packet gateway is the PGW. For ease of description, an example in which the serving gateway is the SGW, and the packet gateway is the PGW is used to describe the solutions provided in the embodiments of the present invention.

Figure 2:
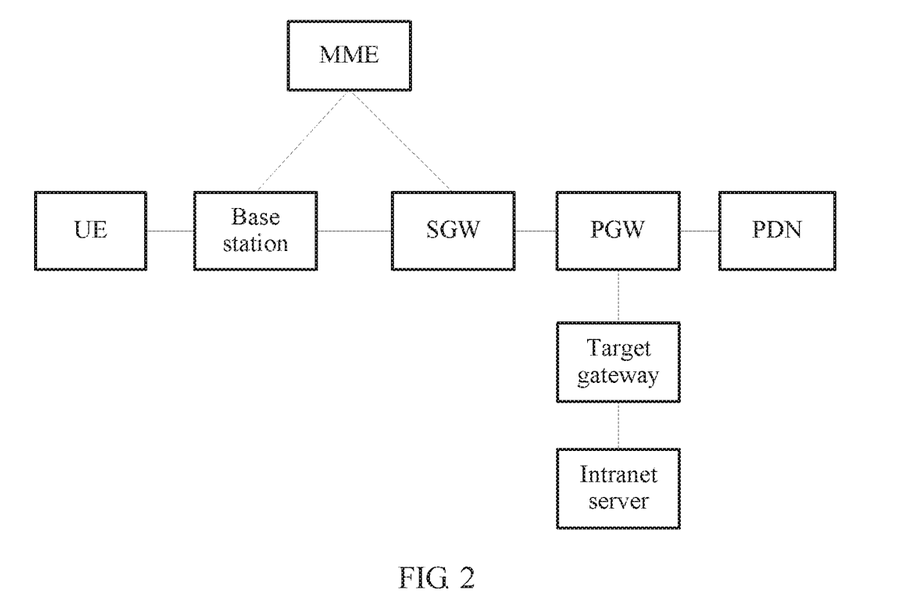
FIG. 2 is a schematic diagram of a possible application scenario in the prior art.

FIG. 2 is a schematic diagram of a system architecture of an LTE network in the prior art. As shown in FIG. 2, when establishing a PDN link, UE accesses an SGW by using a base station, and accesses a PGW by using the SGW. When a target gateway corresponding to a target server to be accessed by a GTPU packet sent by the UE is a GW, the PGW may establish a connection to the GW. The GTPU packet is transmitted to the target server by using a base station, the SGW, the PGW, and the GW. A mobility management entity (MME) serves as a control plane network element, and is separately connected to the base station and the SGW by using a port. This packet transmission path causes route recurvation, which is not conducive to network resource saving.

Figure 3:
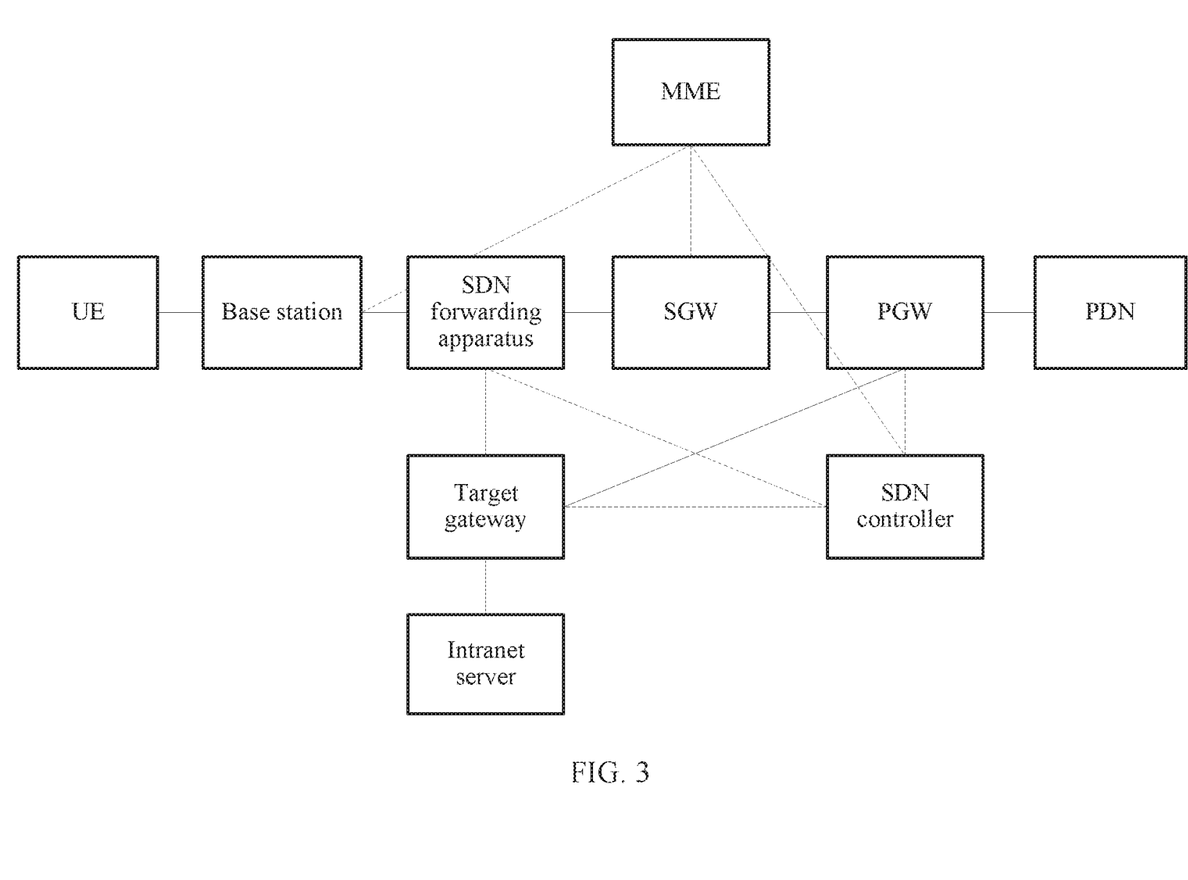
FIG. 3 is a schematic diagram of a possible system architecture according to an embodiment of the present invention.

FIG. 3 is a schematic diagram of a possible system architecture according to an embodiment of the present invention. As shown in FIG. 3, an SDN forwarding apparatus and an SDN controller are introduced on a basis of an existing architecture in this embodiment of the present invention. The SDN forwarding apparatus may be deployed at a Mobile Telephone Switching Office (MTSO) convergence point, near a base station, or inside a base station. The SDN forwarding apparatus may be configured to forward a packet sent by the base station to another device, or receive a packet sent by another device to the base station and forward the packet to the base station. The SDN forwarding apparatus may perform determining and processing on a received packet. The SDN forwarding apparatus is equivalent to a transit device for the base station or the another device. The SDN controller may exchange signaling with an MME, the SDN forwarding apparatus, and gateways (an SGW, a PGW, and a GW).

Optionally, a target gateway in FIG. 3 may be a lightweight gateway. The lightweight gateway may have functions such as path management, bearer assistance, and charging assistance, and keep a connection to the PGW and the base station. The PGW may support functions such as bearer management and charging management initiated by the lightweight gateway.

It should be noted that FIG. 3 is merely used as an example. When the solutions in the embodiments of the present invention are applied to a 2G or 3G network architecture, functions of the SGW may be implemented by a serving general packet radio service support node (SGSN), and functions of the PGW may be implemented by a gateway general packet radio service support node (GGSN).

To resolve the foregoing problem, an embodiment of the present invention provides a packet transmission method. A main idea of the method is that in a case of a single PDN link, an SDN forwarding apparatus receives an uplink GTPU packet sent by a base station, and determines whether a target server of the uplink GTPU packet is an intranet server. When the target server is an intranet server, the SDN forwarding apparatus sends the uplink GTPU packet to a target gateway. When the target server is not an intranet server, the SDN forwarding apparatus sends the uplink GTPU packet to an SGW. The SGW may be a default SGW of the PDN link.

In this embodiment of the present invention, when determining that the target server of the uplink GTPU packet is an intranet server, the SDN forwarding apparatus directly sends the GTPU packet to the target gateway corresponding to the target server, so as to avoid route recurvation of an access path and save network resources.

Figure 4:
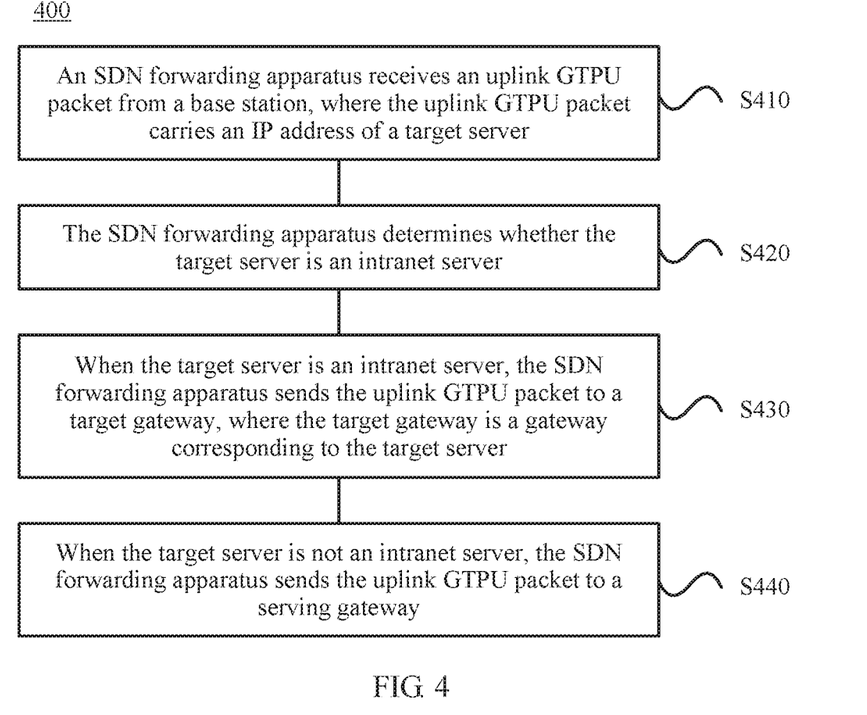
FIG. 4 is a schematic flowchart of a packet transmission method according to an embodiment of the present invention.

The following describes the solution provided in this embodiment of the present invention with reference to FIG. 4. FIG. 4 shows a packet transmission method 400 according to an embodiment of the present invention. As shown in FIG. 4, the method includes the following steps:

Step S410, an SDN forwarding apparatus receives an uplink GTPU packet from a base station, where the uplink GTPU packet carries an IP address of a target server.

The target server may be a server to be accessed by the uplink GTPU packet. The IP address of the target server may be encapsulated in the uplink GTPU packet.

Optionally, the SDN forwarding apparatus may receive an uplink packet sent by the base station, and determine whether the uplink packet is a GTPU packet. If the uplink packet is a GTPU packet, the SDN forwarding apparatus further determines whether a target server of the uplink GTPU packet is an intranet server. If the uplink packet is not a GTPU packet, the SDN forwarding apparatus keeps the original uplink packet unchanged and directly forwards the uplink packet.

Optionally, an IP packet may be encapsulated in the uplink GTPU packet, and a destination address of the IP packet may be the IP address of the target server.

Step S420, the SDN forwarding apparatus determines whether the target server is an intranet server.

The SDN forwarding apparatus may determine, based on the IP address of the target server, whether the target server is an intranet server.

For example, the SDN forwarding apparatus may extract the IP address of the target server from the uplink GTPU packet, and perform matching with a pre-stored flow table rule, to determine whether the target server is an intranet server.

An intranet server may be deployed at a location, such as an intranet domain controller (DC) or a base station.

Step S430, when the target server is an intranet server, the SDN forwarding apparatus sends the uplink GTPU packet to a target gateway, where the target gateway is a gateway corresponding to the target server.

Optionally, the SDN forwarding apparatus may determine an IP address of the target gateway and a tunnel endpoint identifier (TEID) of the target gateway; and the SDN forwarding apparatus sends the uplink GTPU packet to the target gateway based on the IP address of the target gateway and the TEID of the target gateway.

Optionally, the SDN forwarding apparatus may locally search, based on the IP address of the target server, whether the IP address and the TEID of the target gateway exist. If the IP address and the TEID of the target gateway exist, the IP address and the TEID of the target gateway are determined; or if the IP address and the TEID of the target gateway do not exist, the IP address and the TEID of the target gateway are queried in an SDN controller.

Optionally, the SDN forwarding apparatus may receive the IP address and the TEID of the target gateway from the SDN controller. For example, the SDN controller may be configured to instruct the target gateway to assign a TEID. After assigning the TEID, the target gateway sends the TEID to the SDN controller. After obtaining the TEID, the SDN controller may locally store the TEID and send the TEID to the SDN forwarding apparatus. The SDN controller may also store a correspondence between an IP address of a server in a local area network and an IP address of a gateway.

Therefore, the SDN controller determines the IP address of the target gateway based on the IP address of the target server, and sends the IP address of the target gateway to the SDN forwarding apparatus.

Optionally, the SDN controller may determine tunnel information of the target gateway. The tunnel information may include a first IP address and a first TEID, and the tunnel information may further include the IP address of the target gateway and the TEID of the target gateway. The first IP address is an IP address of a target device on a tunnel peer end of the target gateway, and the first TEID is a TEID of the target device on the tunnel peer end of the target gateway. The SDN controller may update the first IP address to an IP address of the base station, and update the first TEID to a TEID of the base station. The base station is a base station corresponding to the SDN forwarding apparatus, that is, the SDN forwarding apparatus is configured to forward a packet from the base station. Then, the SDN controller may send updated tunnel information to the target gateway, so that the target gateway updates tunnel information and sends a packet to the base station based on the updated tunnel information.

Optionally, the SDN forwarding apparatus sends the uplink GTPU packet to the target gateway according to the IP address the TEID of the target gateway. The SDN forwarding apparatus may set a destination IP address of the uplink GTPU packet to the IP address of the target gateway, and set a destination TEID of the uplink GTPU packet to the TEID of the target gateway.

In this embodiment of the present invention, to avoid modifying the base station in the prior art as far as possible, the destination IP address used when the base station sends the uplink GTPU packet may be an IP address of a default serving gateway existing when a PDN link is established; or for the base station, a next hop of the uplink GTPU packet sent by the base station is the same as that in the prior art and is a serving gateway. When receiving the uplink GTPU packet, the SDN forwarding apparatus changes the destination IP address of the uplink GTPU packet from an IP address of the serving gateway to the IP address of the target gateway, and then forwards the uplink GTPU packet to the target gateway. It is equivalent to that, for the base station, the destination address of the uplink GTPU packet is the same as that in the prior art, and is the IP address of the serving gateway. Therefore, a modification to the base station is avoided.

Step S440, when the target server is not an intranet server, the SDN forwarding apparatus sends the uplink GTPU packet to a serving gateway.

It should be understood that the serving gateway may be the default serving gateway existing when the PDN link is established. When the target server is not an intranet server, the SDN forwarding apparatus does not modify the uplink GTPU packet based on an existing procedure, and directly forwards the uplink GTPU packet to the serving gateway. That is, equivalently, the SDN forwarding apparatus performs transparent transmission in this step.

In this embodiment of the present invention, when determining that the target server of the uplink GTPU packet is an intranet server, the SDN forwarding apparatus directly sends the GTPU packet to the target gateway corresponding to the target server, so as to avoid route recurvation of an access path and save network resources.

Optionally, the method 400 further includes:

S450. The SDN forwarding apparatus receives a downlink GTPU packet, and the SDN forwarding apparatus sends the downlink GTPU packet to the base station.

In this step, the SDN forwarding apparatus is further configured to forward, to the base station, a downlink packet that another device sends to the base station.

Optionally, after receiving the downlink packet, the SDN forwarding apparatus may determine whether the downlink packet is a GTPU packet. If the downlink packet is a GTPU packet, the SDN forwarding apparatus may further determine whether a source IP address of the downlink GTPU packet is the target gateway. If the downlink packet is not a GTPU packet, the SDN forwarding apparatus directly forwards the downlink packet to the base station, which is equivalent to transparent transmission.

S460. The SDN forwarding apparatus determines whether a source IP address of the downlink GTPU packet is the IP address of the target gateway. When the source IP address of the downlink GTPU packet is the IP address of the target gateway, the SDN forwarding apparatus changes the source IP address of the downlink GTPU packet to an IP address of the serving gateway.

In this embodiment of the present invention, to avoid modifying the base station in the prior art as far as possible, when receiving the downlink GTPU packet sent by the target gateway, the SDN forwarding apparatus changes the source IP address of the downlink GTPU packet from the IP address of the target gateway to the IP address of the serving gateway, and then forwards the downlink GTPU packet to the base station. It is equivalent to that, for the base station, the source IP address of the downlink GTPU packet is the same as that in the prior art, and is the IP address of the serving gateway, so as to avoid a modification to the base station and improve transmission efficiency.

The following further describes the solutions in the embodiments of the present invention with reference to more accompanying drawings.

Figure 5:
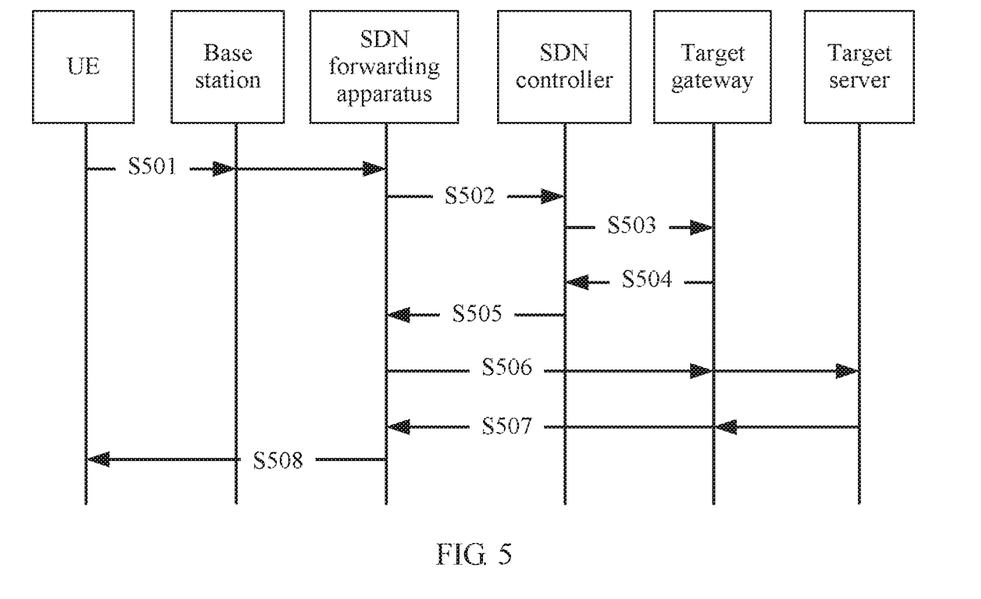
FIG. 5 is a schematic communication diagram of another packet transmission method according to an embodiment of the present invention.

FIG. 5 shows a packet transmission method according to an embodiment of the present invention. In the method, an SDN controller may deliver an offloading and processing rule of a packet to an SDN forwarding apparatus in advance, and UE has established a PDN link with a base station, an SGW, and a PGW. The method is as follows:

S501. A base station receives an IP packet sent by UE, encapsulates the IP packet into an uplink GTPU packet, and sends the uplink GTPU packet to an SDN forwarding apparatus.

In the prior art, after receiving the IP packet sent by the UE, the base station usually encapsulates the IP packet into a GTPU packet and sends the GTPU packet to a next-hop device.

S502. The SDN forwarding apparatus determines that a target server of the uplink GTPU packet is an intranet server, and then determines tunnel information of a target gateway corresponding to the target server. If the tunnel information of the target gateway does not exist, the SDN forwarding apparatus requests an SDN controller to query the tunnel information.

The tunnel information includes an IP address of the target gateway and a TEID of the target gateway. The SDN forwarding apparatus may send related information of the uplink GTPU packet to the SDN controller, for example, a UE identity of the GTPU packet and an IP address of the target server of the uplink GTPU packet, so that the SDN controller determines the tunnel information.

S503. The SDN controller determines whether the tunnel information corresponding to the target gateway exists. If the tunnel information exists, the SDN controller sends the tunnel information to the SDN forwarding apparatus. If the tunnel information does not exist, the SDN controller instructs the target gateway to establish a GTPU tunnel.

The SDN controller may be configured to control and manage information about a tunnel between an intranet SDN forwarding apparatus and another gateway. The tunnel information may include IP addresses and TEIDs of devices on two ends of the tunnel.

The SDN controller may determine the IP address of the target gateway based on the IP address of the target server. If the TEID of the target gateway does not exist locally, the SDN controller may send an instruction message to the target gateway based on the IP address of the target gateway, to instruct the target gateway to establish a GTPU tunnel.

Optionally, in this step, if the tunnel information corresponding to the target gateway does not exist, the SDN controller may obtain UE and bearer quality of service (QoS) information from an MME, and send the UE and bearer QoS information to the target gateway, so that the target gateway establishes a tunnel. The UE and bearer QoS information may include at least one piece of the following information: UE identity information, an international mobile subscriber identity (IMSI) of the UE, a bearer ID, a QoS class identifier (QCI) of a bearer, and the like.

S504. The target gateway establishes a GTPU tunnel, assigns a corresponding TEID, and sends the TEID to the SDN controller.

It should be understood that, in this step, for the target gateway, a peer end of the GTPU tunnel is the base station not the SDN forwarding apparatus. That is, one end of the GTPU tunnel is the base station, and the other end is the target gateway.

S505. After receiving the TEID, the SDN controller sends tunnel information to the SDN forwarding apparatus.

In this step, the tunnel information includes the TEID of the target gateway and/or the IP address of the target gateway.

S506. The SDN forwarding apparatus saves the tunnel information of the target gateway, and sends the uplink GTPU packet to the target gateway based on the tunnel information.

Before sending the uplink GTPU packet, the SDN forwarding apparatus changes a destination IP address of the uplink GTPU packet to the IP address of the target gateway, and changes a destination TEID of the GTPU packet to the TEID of the target gateway.

For the base station, when sending the uplink GTPU packet to the SDN forwarding apparatus, a next-hop address encapsulated in the uplink GTPU packet is an SGW. After the uplink GTPU packet arrives at the SDN forwarding apparatus, the SDN forwarding apparatus changes the next-hop address to the IP address of the target gateway.

The method 500 further includes:

S507. The SDN forwarding apparatus receives a downlink GTPU packet of the target gateway, and changes a source IP address of the downlink GTPU packet to an IP address of the SGW.

In this step, for the base station, a previous hop of the downlink GTPU packet received by the base station is the SGW. In this way, this may be the same as that in the prior art, so as to avoid modifying the base station.

S508. The base station decapsulates the GTPU packet, and sends an IP packet obtained through decapsulation to the UE.

Figure 6:
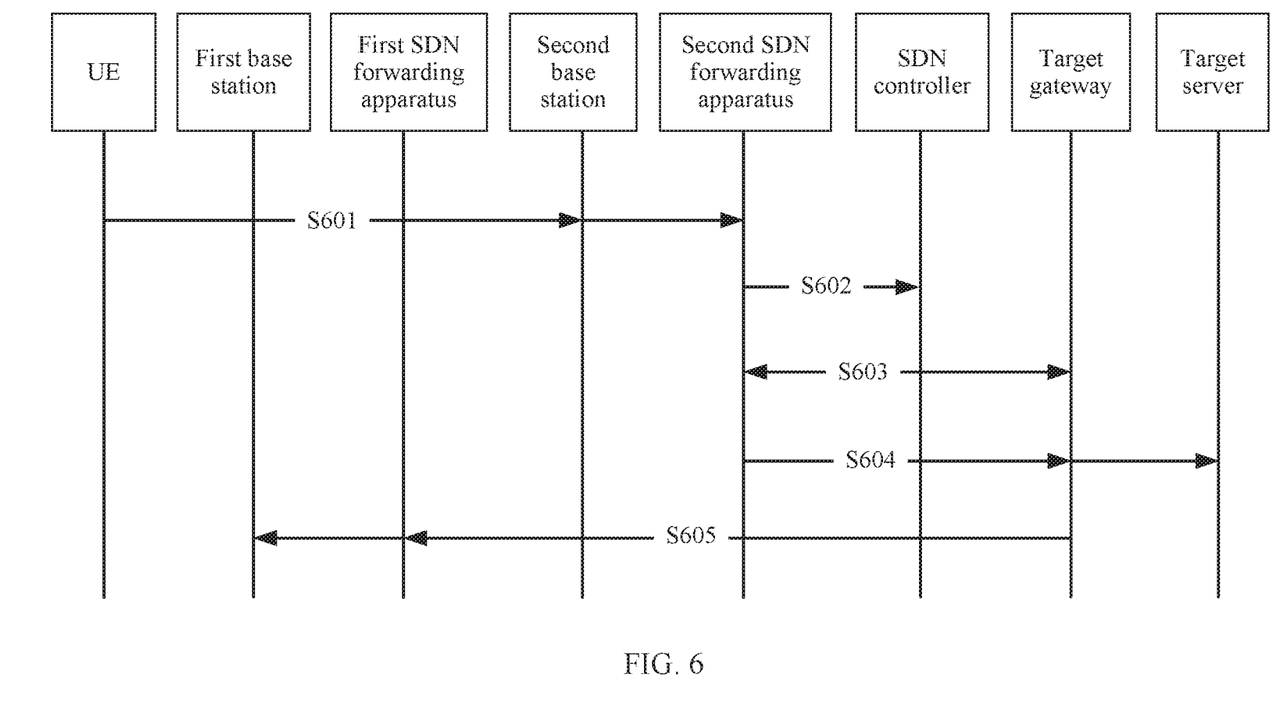
FIG. 6 is a schematic communication diagram of still another packet transmission method according to an embodiment of the present invention.

FIG. 6 shows another packet transmission method according to an embodiment of the present invention. In the method shown in FIG. 6, for content same as or similar to that in the method shown in FIG. 5, refer to detailed descriptions related to FIG. 5, and details are not described herein again. In the method shown in FIG. 6, it is assumed that a base station is switched from a first base station to a second base station. Both the first base station and the second base station support a connection to the SDN forwarding apparatus in the embodiments of the present invention. The first base station and the second base station respectively correspond to a first SDN forwarding apparatus and a second SDN forwarding apparatus. Before the base station is switched, UE communicates with a target server by using the first base station, the first SDN forwarding apparatus, and a target gateway. In addition, the UE has established a PDN link with the first base station, an SGW, and a PGW. The method is described as follows:

S601. After the base station is switched, the second base station receives an IP packet sent by the UE, encapsulates the IP packet into an uplink GTPU packet, and sends the uplink GTPU packet to the second SDN forwarding apparatus.

S602. The second SDN forwarding apparatus determines that a target server encapsulated in the uplink GTPU packet is an intranet server, and then determines tunnel information of a target gateway corresponding to the target server. If the tunnel information of the corresponding target gateway does not exist, the second SDN forwarding apparatus requests an SDN controller to query the tunnel information.

S603. The SDN controller determines that the tunnel information corresponding to the target gateway exists, and the SDN controller updates the tunnel information (changes a peer end in the tunnel information from the first base station to the second base station), instructs the target gateway to update the tunnel information, and sends the tunnel information (an IP address and a TEID of the target gateway) to the second SDN forwarding apparatus.

The tunnel information of the target gateway may include a first IP address and a first TEID. The first IP address is an IP address of a target device on a tunnel peer end of the target gateway, and the first TEID is a TEID of the target device on the tunnel peer end of the target gateway. Before the tunnel information is updated, the first IP address and the first TEID are respectively an IP address and a TEID of the first base station. The foregoing updating of the tunnel information may be that the SDN controller updates the first IP address to an IP address of the second base station and updates the first TEID to a TEID of the second base station.

S604. The second SDN forwarding apparatus saves the tunnel information of the target gateway, and sends the GTPU packet to the target gateway based on the tunnel information.

S605. After determining that the UE is handed over to another base station, the target gateway sends end marker information (for example, End Marker) to the first base station, and the end marker information is forwarded by the first SDN forwarding apparatus to the first base station.

In this embodiment of the present invention, when the base station is switched, and a switched-to base station supports a connection to the SDN forwarding apparatus, the SDN controller updates the tunnel information and sends the tunnel information to the SDN forwarding apparatus and the target gateway, so as to transmit a packet to the target gateway by using the SDN forwarding apparatus.

In this embodiment of the present invention, when the base station is switched, the SDN controller updates the tunnel information and simultaneously instructs the target gateway to update the tunnel information, so as to improve communication efficiency.

Figure 7:
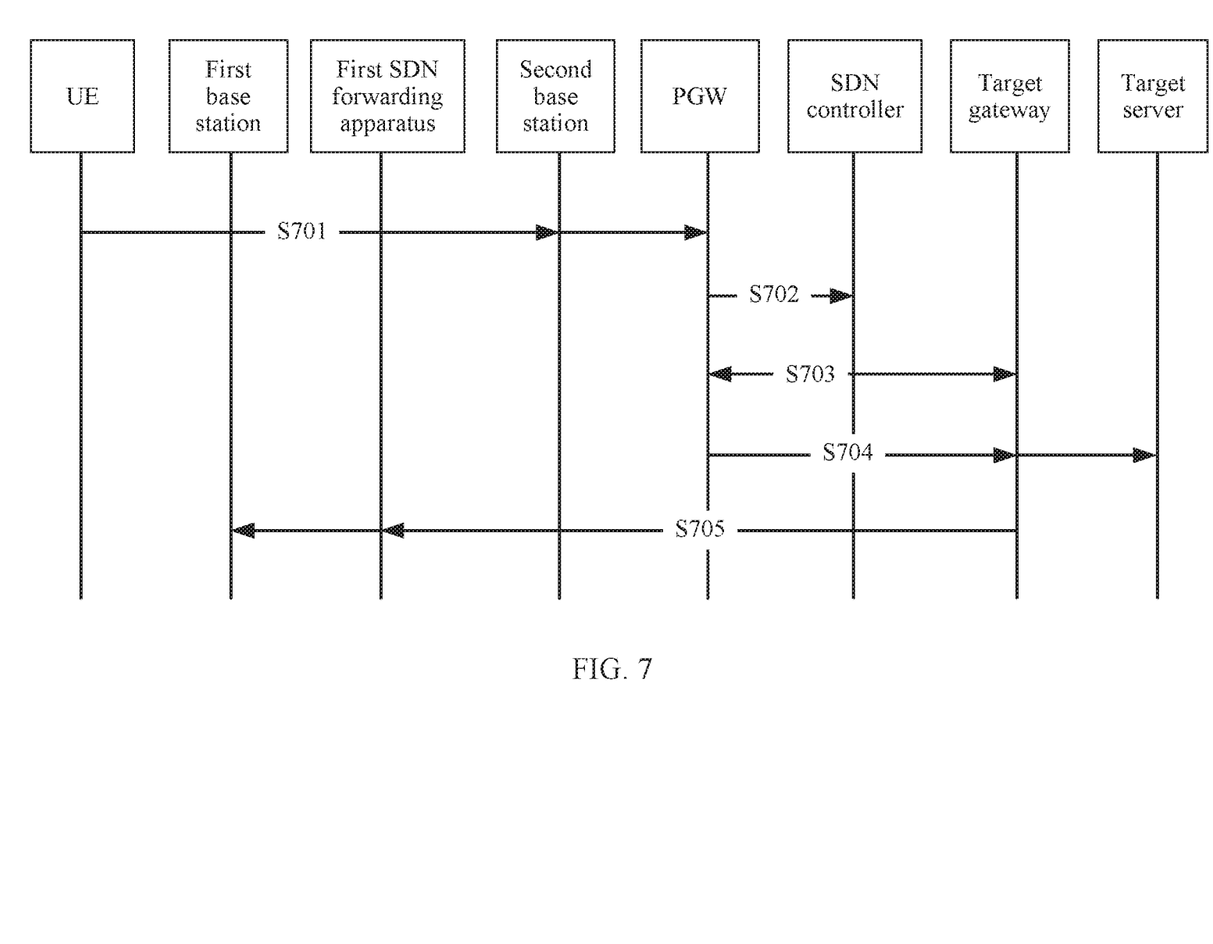
FIG. 7 is a schematic communication diagram of a packet transmission method according to an embodiment of the present invention.

FIG. 7 shows another packet transmission method according to an embodiment of the present invention. In the method shown in FIG. 7, for content same as or similar to that in the method shown in FIG. 5 or FIG. 6, refer to detailed descriptions related to FIG. 5 or FIG. 6, and details are not described herein again. In the method shown in FIG. 7, it is assumed that a base station is switched from a first base station to a second base station. The first base station supports a connection to the SDN forwarding apparatus in the embodiments of the present invention. The second base station does not support a connection to the SDN forwarding apparatus. The first base station corresponds to a first SDN forwarding apparatus. Before the base station is switched, UE communicates with a target server by using the first base station, the first SDN forwarding apparatus, and a target gateway. In addition, the UE has established a PDN link with the first base station, an SGW, and a PGW. The method is described as follows:

S701. After the base station is switched, the second base station receives an IP packet sent by the UE, encapsulates the IP packet into a GTPU packet, and sends the GTPU packet to the PGW by using the SGW.

S702. The PGW determines that a target server encapsulated in the uplink GTPU packet is an intranet server, and then determines tunnel information of a gateway corresponding to the target server. If the tunnel information of the target gateway does not exist, the PGW requests an SDN controller to query the tunnel information.

S703. The SDN controller determines that the tunnel information corresponding to the target gateway exists, and the SDN controller updates the tunnel information (changes a peer end in the tunnel information from the first base station to the PGW), instructs the target gateway to update the tunnel information, and sends the tunnel information (an IP address and a TEID of the target gateway) to the PGW.

The tunnel information of the target gateway may include a first IP address and a first TEID. The first IP address is an IP address of a target device on a tunnel peer end of the target gateway, and the first TEID is a TEID of the target device on the tunnel peer end of the target gateway. Before the tunnel information is updated, the first IP address and the first TEID are respectively an IP address and a TEID of the first base station. The foregoing updating of the tunnel information may be that the SDN controller updates the first IP address to an IP address of the PGW and updates the first TEID to a TEID of the PGW.

S704. The PGW saves the tunnel information of the target gateway, and sends the GTPU packet to the target gateway based on the tunnel information.

S705. After determining that the UE is handed over to another base station, the target gateway sends end marker information (for example, End Marker) to the first base station, and the end marker information is forwarded by the first SDN forwarding apparatus to the first base station.

In this embodiment of the present invention, when the base station is switched, and a switched-to base station does not support a connection to the SDN forwarding apparatus, the SDN controller updates the tunnel information and sends the tunnel information to the PGW and the target gateway, so as to transmit a packet to the target gateway by using the PGW.

In this embodiment of the present invention, when the base station is switched, the SDN controller updates the tunnel information and simultaneously instructs the target gateway to update the tunnel information, so as to improve packet transmission efficiency.

The foregoing mainly describes the solutions in the embodiments of the present invention from the perspective of interaction between network elements. It can be understood that to achieve the foregoing functions, each network element, such as the SDN forwarding apparatus, the SDN controller, and the packet gateway, includes a corresponding hardware structure and/or software module for implementing each function. A person of ordinary skill in the art should be easily aware that, the units and algorithm steps in the examples described with reference to the embodiments disclosed in this specification may be implemented by hardware or a combination of hardware and computer software. Whether a function is performed by hardware or computer software driving hardware depends on particular applications and design constraint conditions of the technical solutions. A person skilled in the art may use different methods to implement the described functions for each particular application, but it should not be considered that the implementation goes beyond the scope of the present invention.

In the embodiments of the present invention, functional unit division may be performed for the SDN forwarding apparatus, the SDN controller, the packet gateway (such as the PGW), and the like based on the foregoing method examples. For example, each functional unit may be divided based on each function, or two or more functions may be integrated into one processing unit. The integrated unit may be implemented in a form of hardware, or may be implemented in a form of a software functional unit. It should be noted that the unit division in the embodiments of the present invention is an example, and is merely logical function division. There may be another division manner in an actual implementation.

Figure 8A:
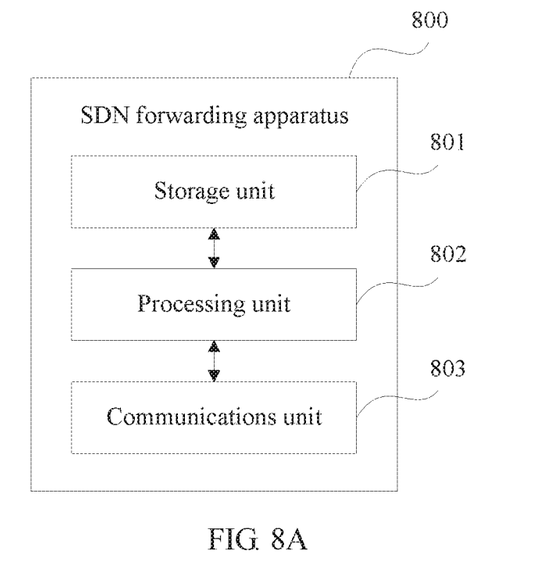
FIG. 8A is a schematic structural diagram of an SDN forwarding apparatus according to an embodiment of the present invention.

When an integrated unit is used, FIG. 8A is a possible structural schematic diagram of the SDN forwarding apparatus in the foregoing embodiments. An SDN forwarding apparatus 800 includes a processing unit 802 and a communications unit 803. The processing unit 802 is configured to control and manage an action of the SDN forwarding apparatus. For example, the processing unit 802 is configured to support the SDN forwarding apparatus in performing processes in FIG. 4 to FIG. 7, and/or is configured to perform another process of the technology described in this specification. The communications unit 803 is configured to support communication between the SDN forwarding apparatus and another network entity, for example, communication with the base station, the SDN controller, the target gateway, and the SGW shown in FIG. 3. The SDN forwarding apparatus may further include a storage unit 801, configured to store program code and data of the SDN forwarding apparatus.

The processing unit 802 may be a processor or a controller, for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. It may implement or execute various examples of logical blocks, modules, and circuits that are described with reference to the contents disclosed in the present invention. The processor may also be a combination of computing functions, for example, a combination of one or more microprocessors or a combination of a DSP and a microprocessor. The communications unit 803 may be a transceiver, a transceiver circuit, a communications interface, or the like. The storage unit 801 may be a memory.

Figure 8B:
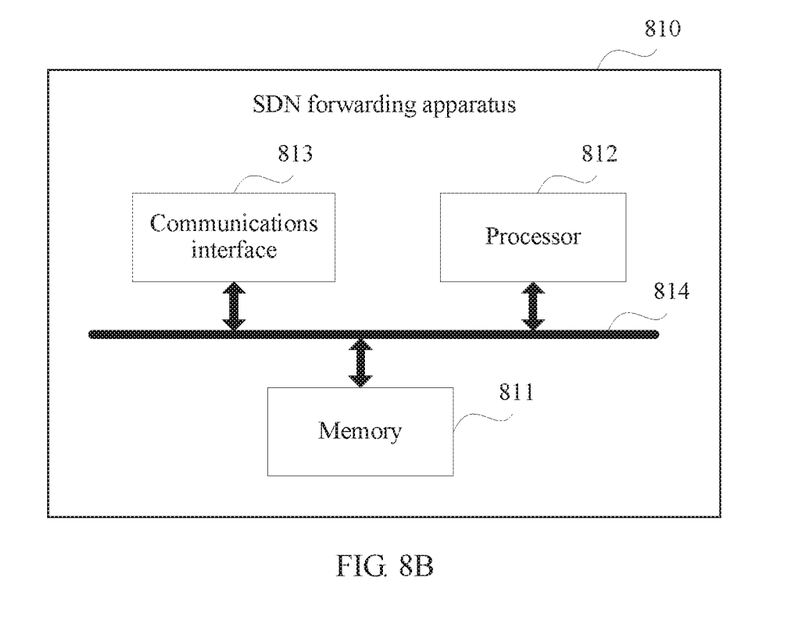
FIG. 8B is a schematic structural diagram of another SDN forwarding apparatus according to an embodiment of the present invention.

When the processing unit 802 is a processor, the communications unit 803 is a communications interface, and the storage unit 801 is a memory, the SDN forwarding apparatus in this embodiment of the present invention may be an SDN forwarding apparatus shown in FIG. 8B.

As shown in FIG. 8B, the SDN forwarding apparatus 810 includes a processor 812, a communications interface 813, and a memory 811. Optionally, the SDN forwarding apparatus 810 may further include a bus 814. The communications interface 813, the processor 812, and the memory 811 may be connected to each other by using the bus 814. The bus 814 may be a peripheral component interconnect (PCI) bus or an extended industry standard architecture (EISA) bus, or the like. The bus 814 may be categorized as an address bus, a data bus, a control bus, or the like. For ease of indication, the bus is indicated by using only one bold line in FIG. 8B. However, it does not indicate that there is only one bus or only one type of bus.

Figure 9A:
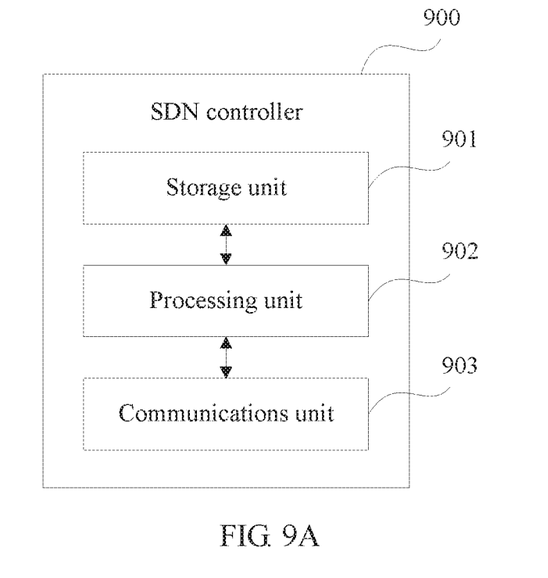
FIG. 9A is a schematic structural diagram of an SDN controller according to an embodiment of the present invention.

When an integrated unit is used, FIG. 9A is a possible structural schematic diagram of the SDN controller in the foregoing embodiments. An SDN controller 900 includes a processing unit 902 and a communications unit 903. The processing unit 902 is configured to control and manage an action of the SDN controller. For example, the processing unit 902 is configured to support the SDN controller in performing processes in FIG. 4 to FIG. 7, and/or is configured to perform another process of the technology described in this specification. The communications unit 903 is configured to support communication between the SDN controller and another network entity, for example, communication with the SDN forwarding apparatus, the target gateway, the PGW, and the MME shown in FIG. 3. The SDN controller may further include a storage unit 901, configured to store program code and data of the SDN controller.

The processing unit 902 may be a processor or a controller, for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. It may implement or execute various examples of logical blocks, modules, and circuits that are described with reference to the contents disclosed in the present invention. The processor may also be a combination of computing functions, for example, a combination of one or more microprocessors or a combination of a DSP and a microprocessor. The communications unit 903 may be a communications interface, a transceiver, a transceiver circuit, or the like. The communications interface is a general term, and in a specific implementation, the communications interface may include one or more interfaces. The storage unit 901 may be a memory.

Figure 9B:
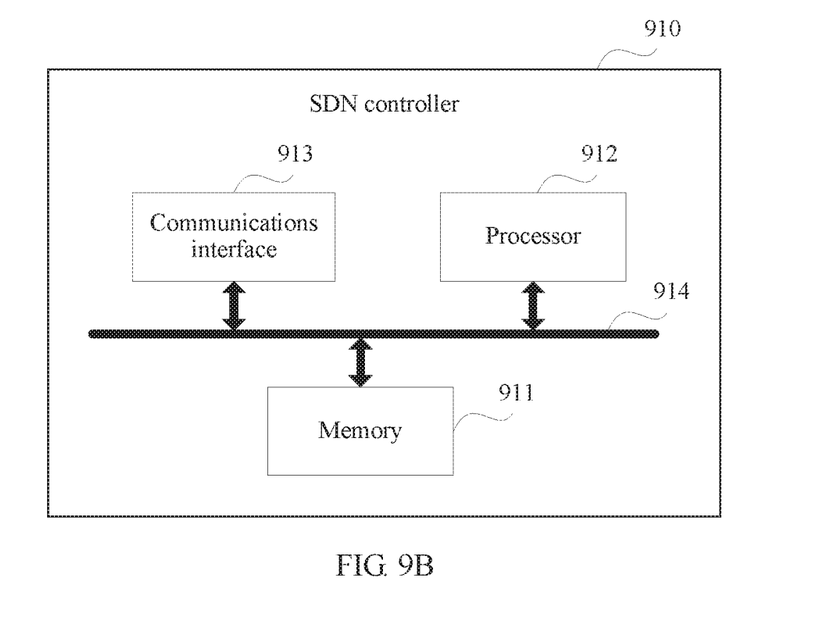
FIG. 9B is a schematic structural diagram of another SDN controller according to an embodiment of the present invention.

When the processing unit 902 is a processor, the communications unit 903 is a communications interface, and the storage unit 901 is a memory, the SDN controller in this embodiment of the present invention may be an SDN controller shown in FIG. 9B.

As shown in FIG. 9B, the SDN controller 910 includes a processor 912, a communications interface 913, and a memory 911. Optionally, the SDN controller 910 may further include a bus 914. The communications interface 913, the processor 912, and the memory 911 may be connected to each other by using the bus 914. The bus 914 may be a peripheral component interconnect (PCI) bus or an extended industry standard architecture (EISA) bus, or the like. The bus 914 may be categorized as an address bus, a data bus, a control bus, or the like. For ease of indication, the bus is indicated by using only one bold line in FIG. 9B. However, it does not indicate that there is only one bus or only one type of bus.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined according to A. However, it should further be understood that determining B according to A does not mean that B is determined according to A only; that is, B may also be determined according to A and/or other information.

A person of ordinary skill in the art may be aware that, the units and steps in the examples described with reference to the embodiments disclosed herein may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, apparatuses, or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

It may be understood that, for the brevity and clarity of the application document, technical features and description in an embodiment in the foregoing are applicable to other embodiments, and are no longer described in detail one by one in the other embodiments.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A packet transmission method, comprising:
   receiving, by a software-defined networking (SDN) forwarding apparatus, an uplink general packet radio service tunneling protocol user plane (GTPU) packet from a base station, wherein the uplink GTPU packet carries an Internet Protocol (IP) address of a target server;
   determining, by the SDN forwarding apparatus, whether the target server is an intranet server; and
   when the target server is an intranet server, sending, by the SDN forwarding apparatus, the uplink GTPU packet to a target gateway, wherein the target gateway is a gateway corresponding to the target server; or
   when the target server is not an intranet server, sending, by the SDN forwarding apparatus, the uplink GTPU packet to a serving gateway.

2. The method according to claim 1, wherein the sending, by the SDN forwarding apparatus, the uplink GTPU packet to a target gateway comprises:
   determining, by the SDN forwarding apparatus, an IP address of the target gateway and a tunnel endpoint identifier (TEID) of the target gateway; and
   sending, by the SDN forwarding apparatus, the uplink GTPU packet to the target gateway according to the IP address and the TEID of the target gateway.

3. The method according to claim 2, wherein the determining, by the SDN forwarding apparatus, an IP address of the target gateway and a TEID of the target gateway comprises:
   receiving, by the SDN forwarding apparatus, the IP address and the TEID of the target gateway from an SDN controller, wherein the SDN controller is configured to instruct the target gateway to assign the TEID.

4. The method according to claim 2, wherein the sending, by the SDN forwarding apparatus, the uplink GTPU packet to the target gateway according to the IP address the TEID of the target gateway comprises:

setting, by the SDN forwarding apparatus, a destination IP address of the uplink GTPU packet to the IP address of the target gateway, and setting a destination TEID of the uplink GTPU packet to the TEID.

5. The method according to claim 1, wherein the determining, by the SDN forwarding apparatus, whether the target server is an intranet server comprises:

determining, by the SDN forwarding apparatus based on the IP address of the target server, whether the target server is an intranet server.

6. The method according to claim 1, wherein the method further comprises:

receiving, by the SDN forwarding apparatus, a downlink GTPU packet; and sending, by the SDN forwarding apparatus, the downlink GTPU packet to the base station.

7. The method according to claim 6, wherein before the sending, by the SDN forwarding apparatus, the downlink GTPU packet to the base station, the method further comprises:

determining, by the SDN forwarding apparatus, whether a source IP address of the downlink GTPU packet is the IP address of the target gateway; and when the source IP address of the downlink GTPU packet is the IP address of the target gateway, changing, by the SDN forwarding apparatus, the source IP address of the downlink GTPU packet to an IP address of the serving gateway.

8. A software-defined networking (SDN) forwarding apparatus, comprising:

a memory, configured to store computer executable program code; and a processor, coupled to the memory, wherein the program code comprises an instruction, and when the processor executes the instruction, the instruction enables a first management unit to perform the following operations:

receiving an uplink general packet radio service tunneling protocol user plane (GTPU) packet from a base station by using a communications unit, wherein the uplink GTPU packet carries an Internet protocol (IP) address of a target server;

determining whether the target server is an intranet server; and when the target server is an intranet server, sending the uplink GTPU packet to a target gateway, wherein the target gateway is a gateway corresponding to the target server; or when the target server is not an intranet server, sending the uplink GTPU packet to a serving gateway.

9. The SDN forwarding apparatus according to claim 8, wherein sending the uplink GTPU packet to a target gateway comprises:

determining an IP address of the target gateway and a tunnel endpoint identifier (TEID) of the target gateway; and sending the uplink GTPU packet to the target gateway according to the IP address and the TEID of the target gateway.

10. The SDN forwarding apparatus according to claim 9, wherein determining an IP address of the target gateway and a tunnel endpoint identifier TEID of the target gateway comprises:

receiving the IP address and the TEID of the target gateway from an SDN controller, wherein the SDN controller is configured to instruct the target gateway to assign the TEID.

11. The SDN forwarding apparatus according to claim 9, wherein sending the uplink GTPU packet to the target gateway according to the IP address and the TEID of the target gateway comprises:

setting a destination IP address of the uplink GTPU packet to the IP address of the target gateway, and setting a destination TEID of the uplink GTPU packet to the TEID.

12. The SDN forwarding apparatus according claim 8, wherein determining whether the target server is an intranet server comprises:

determining, based on the IP address of the target server, whether the target server is an intranet server.

13. The SDN forwarding apparatus according to claim 8, wherein the operations further comprise:

receiving a downlink GTPU packet; and sending the downlink GTPU packet to the base station.

14. The SDN forwarding apparatus according to claim 13, wherein before sending the downlink GTPU packet to the base station, the operations further comprise:

determining whether a source IP address of the downlink GTPU packet is the IP address of the target gateway; and when the source IP address of the downlink GTPU packet is the IP address of the target gateway, modifying the source IP address of the downlink GTPU packet to an IP address of the serving gateway.

* * * * *